June 18, 1935.     R. PUDELKO     2,005,108
RECORDING METER
Filed Aug. 19, 1931
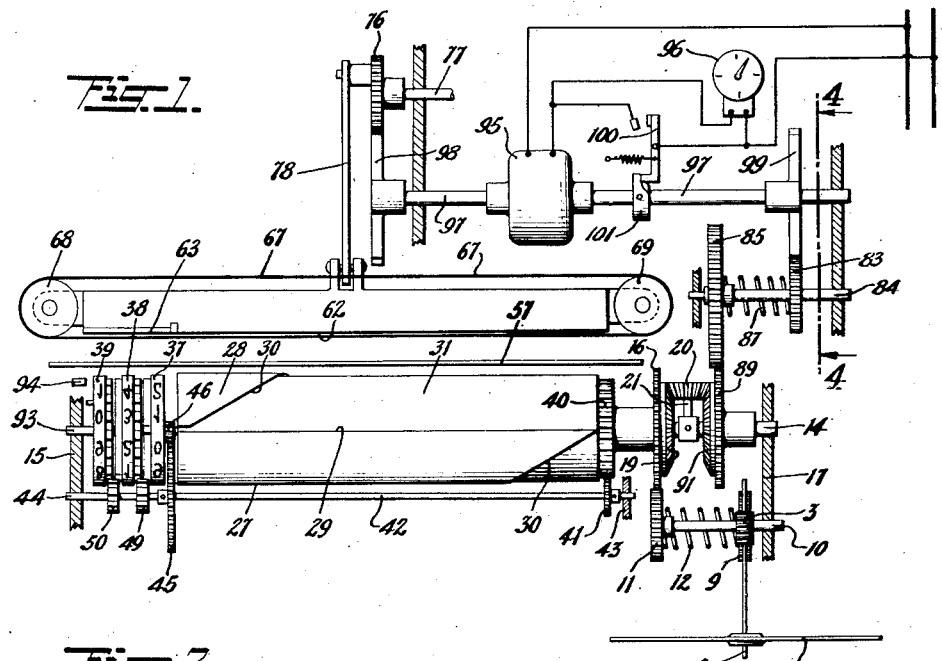
Fig. 1.
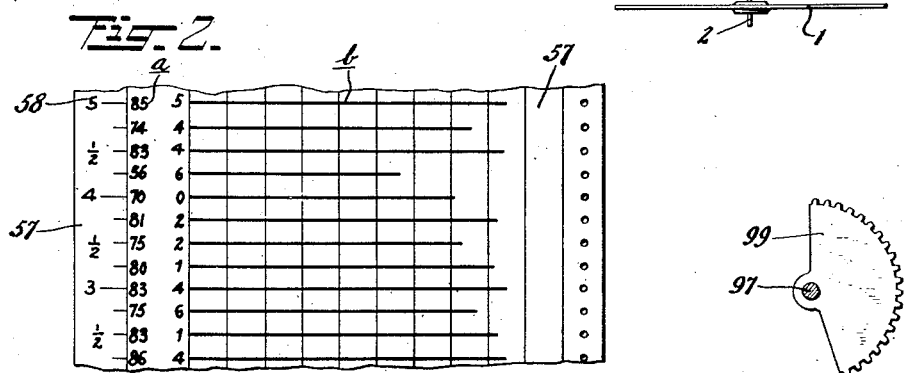
Fig. 2.
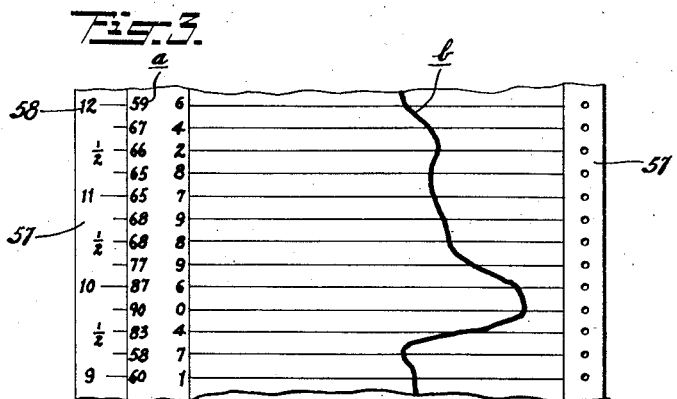
Fig. 3.
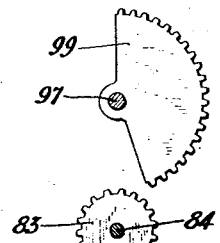
Fig. 4.
INVENTOR
Riccard Pudelko.
BY
Morgan, Finnegan and Durham
ATTORNEYS Patented June 18, 1935

2,005,108

UNITED STATES PATENT OFFICE 2,005,108

RECORDING METER

Riccard Pudelko, Zug, Switzerland, assignor to Landis & Gyr, A.-G., a corporation of Switzerland Application August 19, 1931, Serial No. 558,066
In Switzerland September 2, 1930

2 Claims. (Cl. 234—1)

The invention relates to new and useful improvements in mechanisms for recording energy flow or other physical magnitudes; and in certain of its features more especially to such improvements in mechanisms designed to give a timed record of electrical energy consumption or output.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:—

Fig. 1 is an elevation, partly diagrammatic, of a mechanism constructed and operating in accordance with the invention;

Fig. 2 is a fragmentary view of one form of record sheet produced by the mechanism of Fig. 1;

Fig. 3 is a fragmentary view of a different form of record sheet, and

Fig. 4 is a section taken on the line 4—4 of Fig. 1.

The invention has as one of its principal objects the making or production of a record showing concurrently, and preferably on a single sheet, both a numerical and graphical record of energy output or consumption in connection with a record of the actual and elapsed time. In one of its particular adaptations, the invention is applied to a maximum demand meter mechanism, and as so applied preferably produces on a single record sheet a series or succession of ordinates, and also an associated and corresponding series of numerical values, representing the energy output or consumption during predetermined elapsed time periods, the time periods and the actual time likewise being printed in alignment or other convenient juxtaposition upon the sheet.

The invention provides a single measuring instrumentality for recording energy flow and other physical magnitudes, whereby both a numerical and a graphic recordation of the flow or magnitude is made, preferably on a single record sheet; thereby securing in a single or concurrent record the advantages of both systems of recordation, and obtaining also the checking effect of each system against possible error in the other. Such combined record also shows a clear graphic picture of the recorded physical magnitudes, and moreover, gives immediate numerical indications of the graphic records corresponding to the physical magnitude.

The recording instrument can be provided with two recording devices controlled by the measuring system and adapted for graphic and numerical recording and with a printing device which is periodically actuated and which effects at least the numerical recording of the magnitudes on the recording strip or chart. If the measuring instrument be made in the form of a maximum demand meter, there are provided two recording devices adapted for the graphic and numerical recording of the magnitudes and controlled by the measuring system, viz. a periodically actuated printing device producing the two different records on the recording strip or chart and a setting back device returning the two recording devices to the zero position at the end of the recording period. Preferably the printing and the setting back devices are controlled by an auxiliary motor, in order to remove the load from the measuring system.

The foregoing general description, and the following detailed description as well, are illustrative and exemplary, but not restrictive of the invention.

Referring now to the embodiment of the invention shown by way of example in the accompanying drawing, the metering mechanism is represented somewhat conventionally by a meter disc 1 fixed on a spindle 2, there being a driving worm 3 also fixed on the spindle, all in a well-known manner.

The means for periodically making the graphical record of the measured quantities may be similar to the means shown and described in the patent to Mettler 1,598,739 of 1926, and is so shown in connection with the illustrative embodiment of the present invention.

In the embodied means for driving from the meter the devices for making the concurrent graphical and numerical records of the energy output or consumption for a predetermined time period, the worm 3 meshes with and drives a worm wheel 9, loosely mounted on a shaft 10. Also loosely mounted on the shaft 10 is a gear wheel 11, which is driven from and with the worm wheel 3 by means of a friction drive, comprising a helical compression spring 12 embracing the shaft 10 and bearing at its ends on the worm wheel and the gear, respectively. This friction drive advances the recording mechanism accurately with the meter, and also prevents damage to, or disturbance of, the meter during the opposite restoring movement of the recording mechanism. Meshing with gear wheel 11 is a gear wheel 16, loosely mounted on a shaft 14, which shaft extends across and is journaled in the side frames 15 and 17 of the mechanism. This shaft 14 rotates the record-making mechanisms, as will be later described. Means are provided whereby the meter mechanism 1 will drive shaft 14 forwardly during the energy recording time period, and therewith the record-making mechanism, and cooperating therewith are means whereby the shaft 14 is oppositely rotated to substantially instantly restore the record-making mechanism to initial position at the end of a time period. As embodied, integral with gear wheel 16 is a bevel sun wheel 19, with which meshes a bevel planet wheel 20, which is loosely mounted on an arm 21. Arm 21 is fixed to shaft 14, so that the shaft 14 is rotated by and with the planet wheel 20, in one direction during the record-making movement, and in the opposite direction during the restoring movement.

In the embodied form of mechanism, the graphical representation of the measure of energy for the elapsed predetermined time period is printed as an ordinate. In said embodiment a roller 27 is fixed on shaft 14 (which it will be recalled is frictionally driven from the meter) to rotate therewith. The length of the ordinate or graph line printed is determined by providing the roller 27 with a high printing surface, and a depressed non-printing surface. These are so shaped and disposed that, with the particular kind of printing means employed, the length of the ordinate as printed on the record sheet will be determined by the amount of angular motion or rotation which has been imparted to the roller 27 during the predetermined time period. As embodied, the high or printing surface 28 of the roller has one edge 29 thereof extending along the surface of the roller substantially as an element of the cylindrical surface, the other edge 30 substantially in the form of a helix, having a pitch substantially equal to the length of the roller, the two edges on the high part 28 meeting at the ends of the roller. The remaining surface area 31 of the roller is depressed, or of shorter radius, so as to render it nonprinting. By means of the mechanism already described it will be seen that as the meter mechanism 1 is driven, the cylinder 27 will be rotated, and gradually of greater length, considered along an element of the cylinder, of the high or printing part 28 of the roller 27 will be presented at any given printing point.

Referring now to the mechanism for storing and recording the numerical value of the current for a predetermined time interval, a plurality of counting wheels 37, 38 and 39 (which also act as printing devices) are mounted loosely on shaft 14, at the other end of the roller 27. As embodied, the counting mechanism is rotated directly from roller 27. For this purpose, fixed to the other end of roller 27 is a gear wheel 40, which meshes with a pinion 41, fixed on a shaft 42, which shaft is journaled at 43 and 44 in the machine frame. Fixed also on shaft 42 is a gear wheel 45, meshing with a pinion 46, fixed to the units, or other lowest denomination or quantity, number wheel 37. Suitable carrying, or forwarding, driving gear mechanisms 49 and 50, which may be of any suitable form, connect the number wheels in the usual manner, these mechanisms being loosely mounted on shaft 42.

The record-making sheet 57 is fed by a clock mechanism, and is guided in close proximity to the mechanisms just described, so that the energy readings indicated by the position of the roller 27 and the number wheels 37, 38 and 39 may be imprinted or otherwise transferred to the record sheet at the end of the predetermined time intervals. The actual and elapsed time will likewise be printed on the record sheet, and will be progressed in said timed relation, by the clock mechanism, as indicated at 58.

The embodied form of printing means coacting with the roller 27 and number wheels 37, 38 and 39, previously described, operates as a platen mechanism, which is pressed against the roller 27 and the number wheels at the end of each predetermined time period. As embodied, a platen 61 is mounted close to the record sheet 59, and is reciprocable to and fro by any suitable means, such as guides of the usual form. As the ordinate, or other graph printing means coacting with cylinder 27, on the printing surface of the platen 61, opposite the cylinder 27, is a straight, projecting sharp edge 62, which may be regarded as parallel to, or corresponding to an element of the cylinder 27. As the coacting means for printing the numerical values, at the end of the platen 61, just opposite the numbering wheels is a flat smooth portion 63, adapted to press the record sheet 57 against the number wheels and to make an imprint therefrom upon the record sheet, giving the numerical value corresponding to the graphical record.

The platen 61 is provided with an endless ribbon 67, passing over rollers 68 and 69 at either end of the platen, the ribbon thus being between the platen and the record sheet 57. When the platen is actuated, at the end of a predetermined time interval, it presses against the record sheet 57 and carries the sheet against the roller 27 and the numbering wheels, and the figures in printing position of the number wheels will be printed on the record sheet as shown at $a$. At the same time the edge 62 will press the ribbon and the record sheet against the high part 28 of the roller 27, and the length of the straight line or ordinate $b$ which is printed on the record sheet 57 will be determined by the part of the helical edge 30, and consequently of the raised or printing portion 28 of the roller 27, which is then opposite the ordinate marking device 62, the length of the line $b$ corresponding of course to the magnitude measured in the time period.

In the preferred form of motive or actuating means for printing the record at the end of each predetermined time interval and for restoring the mechanism to initial position to make a new record for the succeeding time interval, there is an auxiliary motor 95 governed by a time switch 96, which may be of any standard or other suitable design. At the end of a predetermined period of time, for example, every fifteen minutes, the auxiliary motor 95 is switched in automatically by the time switch 96, and the motor then first actuates the mechanism for printing the combined record for said elapsed time on the record sheet. After the printing on the record sheet has been effected, and beginning during the return movement of the printing mechanism, if desired, by means of separate driving connections from the motor to the restoring mechanism for the recording means, the latter is practically instantly restored to initial position, preparatory for measuring the energy during the new time interval.

The means for operating both the printing and restoring mechanism from the motor 95 comprises a common motor shaft 97, which projects from both sides of the motor 95, and similar gear segments 98, 99 one carried on each end of the shaft 97. Gear segment 98 is adapted to mesh with the gear 76 of the printing mechanism and drive it one complete revolution. Gear segment 99 is adapted to mesh with the gear 83 of the restoring mechanism and to rotate same a sufficient amount to return the mechanism to the desired point for a new recording.

Means are provided for stopping the motor 95 after one cycle of printing and restoring operations and as embodied, comprise a switch 100 and a cam 101 on motor shaft 97 to control said switch. In operation the time switch 96 starts the motor 95 which then closes switch 100 at which time switch 96 is disconnected. The motor continues operation until it completes its cycle and is stopped by the cam 101 breaking the connection through switch 100.

Referring first to the drive for the printing devices, as embodied, connected to the motor so as to receive a single rotation when the time switch energizes the motor 95, is a gear wheel 76 mounted on a shaft 77. The gear wheel has pivotally connected thereto one end of a connecting rod 78, the other end of the rod being pivotally connected at 79 to the platen 61, and thereby the platen receives a single actuation just prior to the restoring movement of the recording mechanism. For the purpose of restoring the recording mechanism, as embodied, a gear wheel 83 is connected with the auxiliary motor, the gear wheel being loosely mounted on a shaft 84. A pinion 85 is likewise loosely mounted on shaft 84, and is frictionally connected to gear wheel 83 to rotate therewith, by means of a helical spring 87, mounted on shaft 84 and in compression between the gears 83 and 85. Meshing with pinion 85 is a gear wheel 89 loosely journaled on shaft 14, and having a bevel sun wheel 91 fixed thereto which meshes with the planet wheel 20. After the record is printed, as already described, the motor drives gear wheel 83, and through planet wheel 20, reversely rotates roller 27, and through gears 40, 41 and 45, 46 reversely rotates the numbering wheels, and brings them all back to initial recording position. To arrest the recording roller 27 and the numbering wheels at initial position, a stop pin 93 on wheel 39 engages with a stop 94 on the frame, the friction drive 87 permitting this irrespective of the exact stopping point or time of the auxiliary motor. The motor is then thrown out by a time switch, and the roller 27 and the numbering wheels are again advanced by the meter mechanism 1 to make the energy record in the new time period.

If desired specific forms of the graphic record may be made other than that which is effected by a recording measuring apparatus as shown in Figure 1.

The invention in its broader aspects is not limited to the specific mechanisms shown and described but departures may be made therefrom within the scope of the accompanying claims without departing from the principles of the invention and without sacrificing its chief advantages.

What I claim is:—

1. An energy flow measuring instrument including in combination a meter, means driven by the meter proportional to the energy flow, and devices, including a coacting platen, for making both a graphic and numerical record at the end of a predetermined time period.

2. An energy flow measuring instrument including in combination a meter, a numerical recording device, a rotatory graphical recording device, means for driving both said devices from the meter, means, including a coacting platen, for making a concurrent numerical and graphical record from said devices, and means for restoring said device to an initial position for making a new energy measurement.

RICCARD PUDELKO.